United States Patent
Morgan (10) Patent No.: US 9,665,553 B1
(45) Date of Patent: May 30, 2017

(54) TECHNIQUES FOR DETERMINING A LOCATION OF USER INTERACTION WITHIN A TABLE OF A WEB PAGE

(71) Applicant: David Thomas Morgan, Zurich (CH)

(72) Inventor: David Thomas Morgan, Zurich (CH)

(73) Assignee: Google Inc., Mountain View, CA (US)

( * ) Notice: Subject to any disclaimer, the term of this patent is extended or adjusted under 35 U.S.C. 154(b) by 407 days.

(21) Appl. No.: 13/738,407

(22) Filed: Jan. 10, 2013

(51) Int. Cl.
G06F 17/00 (2006.01)
G06F 17/24 (2006.01)

(52) U.S. Cl.
CPC .................... *G06F 17/245* (2013.01)

(58) Field of Classification Search
None
See application file for complete search history.

(56) References Cited

U.S. PATENT DOCUMENTS

| | | | | |
|---|---|---|---|---|
| 6,311,196 B1* | 10/2001 | Arora | .................. | G06F 17/211 715/209 |
| 6,988,241 B1* | 1/2006 | Guttman | ............... | G06F 17/246 707/E17.115 |
| 7,260,777 B2* | 8/2007 | Fitzsimons et al. | .......... | 715/255 |
| 2005/0120293 A1* | 6/2005 | Benhase | ............... | G06F 17/246 715/217 |
| 2008/0104091 A1* | 5/2008 | Chin | ..................... | G06F 17/245 |
| 2008/0201118 A1* | 8/2008 | Luo | ..................... | G06F 17/3089 703/2 |

OTHER PUBLICATIONS

Stack Overflow, Highlighting a Table Correctly Despite rowspan and colspan attributes—Without jQuery, retrieved from URL: http://stackoverflow.com/questions/1495339/highlighting-a-table-correctly-despite-rowspan-and-colspan-attributes-without, Retrieved on Jul. 14, 2015 (3 pages).

* cited by examiner

Primary Examiner — Scott Baderman
Assistant Examiner — Steven Golden
(74) Attorney, Agent, or Firm — Foley & Lardner LLP; John D. Lanza (57) ABSTRACT

A computer-implemented technique includes receiving, at a computing device including one or more processors, a source document for a web page from a server, the source document including program code and information representing a table of the web page. The technique includes determining a range of pixel positions for each header cell element of the table, wherein the header cell elements represent cells of a top row of the table. The technique includes receiving input from a user, the input indicating an interaction by the user at a position within the table of the web page. The technique includes selecting a column of the table based on the position of the user interaction and the ranges of pixel positions to obtain a selected column. The technique also includes executing a portion of the program code associated with the selected column.

12 Claims, 6 Drawing Sheets

TECHNIQUES FOR DETERMINING A LOCATION OF USER INTERACTION WITHIN A TABLE OF A WEB PAGE

FIELD

The present disclosure relates to web pages and, more particularly, to techniques for determining a location of user interaction within a table of a web page.

BACKGROUND

The background description provided herein is for the purpose of generally presenting the context of the disclosure.

A web server can be configured to provide a source document for a web page to a computing device via a network. The web server can provide the source document in response to a request from the computing device. The computing device can generate and display the web page using web browser software executing on the computing device. The source document can include text and tags indicating hyperlinks and formatting. The formatting can include text formatting (bold, italics, underline, etc.) as well as formatting for a layout of the web page (frames, tables, alignment, etc.). For example, the source document can be a hypertext markup language (HTML) document. The source document can also include program code (or "script") that can be interpreted by the web browser software in order to execute one or more functions in the web browser software at the computing device. For example, the program code can be Javascript.

SUMMARY

A computer-implemented technique is presented. The technique can include receiving, at a computing device including one or more processors, a source document for a web page from a server. The source document can include Javascript code and information representing a table of the web page. The table can include a plurality of cells arranged in two or more columns and one or more rows, the plurality of cells including a specific cell that spans more than one column. The Javascript code can include two or more portions associated with the two or more columns, respectively. The technique can include generating, at the computing device, the web page using the source document and web browser software executing on the computing device. The technique can include during generation of the web page, determining, at the computing device, a range of pixel positions for each header cell element of the table, wherein the header cell elements represent cells of a top row of the table. The technique can include displaying, at the computing device, the web page to a user at the computing device. The technique can include receiving, at the computing device, input from the user, the input indicating interaction by the user at a position within the specific cell that spans more than one column. The technique can include selecting, at the computing device, one of the columns spanned by the specific cell based on the position of the user interaction and the ranges of pixel positions for the header cell elements associated with the columns spanned by the specific cell to obtain a selected column. The selected column can have a specific header cell element with a corresponding range of pixel positions that includes the position of the user interaction. The technique can also include executing, at the computing device, one of the two or more portions of the Javascript code associated with the selected column.

Another computer-implemented technique is also presented. The technique can include receiving, at a computing device including one or more processors, a source document for a web page from a server, the source document including program code and information representing a table of the web page. The technique can include determining, at the computing device, a range of pixel positions for each header cell element of the table, wherein the header cell elements represent cells of a top row of the table. The technique can include receiving, at the computing device, input from a user, the input indicating an interaction by the user at a position within the table of the web page. The technique can include selecting, at the computing device, a column of the table based on the position of the user interaction and the ranges of pixel positions to obtain a selected column. The technique can also include executing, at the computing device, a portion of the program code associated with the selected column.

In some embodiments, the selected column is a specific column of the table having a specific header cell element with a corresponding range of pixel positions that includes the position of the user interaction.

In other embodiments, the technique further includes generating, at the computing device, the web page using the source document and web browser software executing on the computing device.

In some embodiments, determining the ranges of pixel positions for the header cell elements of the table occurs during the generation of the web page.

In other embodiments, the technique further includes displaying, at the computing device, the web page to a user at the computing device using the web browser software.

In some embodiments, the table includes a plurality of cells arranged in two or more columns and one or more rows, the plurality of cells including a specific cell that spans more than one column.

In other embodiments, the input indicates interaction by the user at a position within the specific cell that spans more than one column.

In some embodiments, the selecting to obtain the selected column includes selecting one of the columns spanned by the specific cell based on the position of the user interaction and ranges of pixel positions for the header cell elements associated with the columns spanned by the specific cell.

In other embodiments, the selected column has a specific header cell element with a corresponding range of pixel positions that includes the position of the user interaction.

In some embodiments, the program code includes two or more portions associated with the two or more columns, respectively, and executing the portion of the program code further includes executing one of the two or more portions of the program code associated with the selected column.

A computing device is also presented. The computing device can include a communication device, one or more processors, and a user interface. The communication device can be configured to receive a source document for a web page from a server, the source document including program code and information representing a table of the web page. The one or more processors can be configured to determine a range of pixel positions for each header cell element of the table, wherein the header cell elements represent cells of a top row of the table. The user interface can be configured to receive input from a user, the input indicating an interaction by the user at a position within the table of the web page. The one or more processors can be further configured to select a column of the table based on the position of the user interaction and the ranges of pixel positions to obtain a selected column, and execute a portion of the program code associated with the selected column.

In some embodiments, the selected column is a specific column of the table having a specific header cell element with a corresponding range of pixel positions that includes the position of the user interaction.

In other embodiments, the one or more processors are further configured to generate the web page using the source document and web browser software executing on the computing device, and the determination of the ranges of pixel positions for the header cell elements of the table by the one or more processors occurs during the generation of the web page.

In some embodiments, the user interface is further configured to display the web page to a user at the computing device using the web browser software.

In other embodiments, the table includes a plurality of cells arranged in two or more columns and one or more rows, the plurality of cells including a specific cell that spans more than one column.

In some embodiments, the input indicates interaction by the user at a position within the specific cell that spans more than one column.

In other embodiments, the one or more processors are configured to obtain the selected column by selecting one of the columns spanned by the specific cell based on the position of the user interaction and ranges of pixel positions for the header cell elements associated with the columns spanned by the specific cell.

In some embodiments, the selected column has a specific header cell element with a corresponding range of pixel positions that includes the position of the user interaction.

In other embodiments, the program code includes two or more portions associated with the two or more columns, respectively, and the one or more processors are configured to execute the portion of the program code by executing one of the two or more portions of the program code associated with the selected column.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
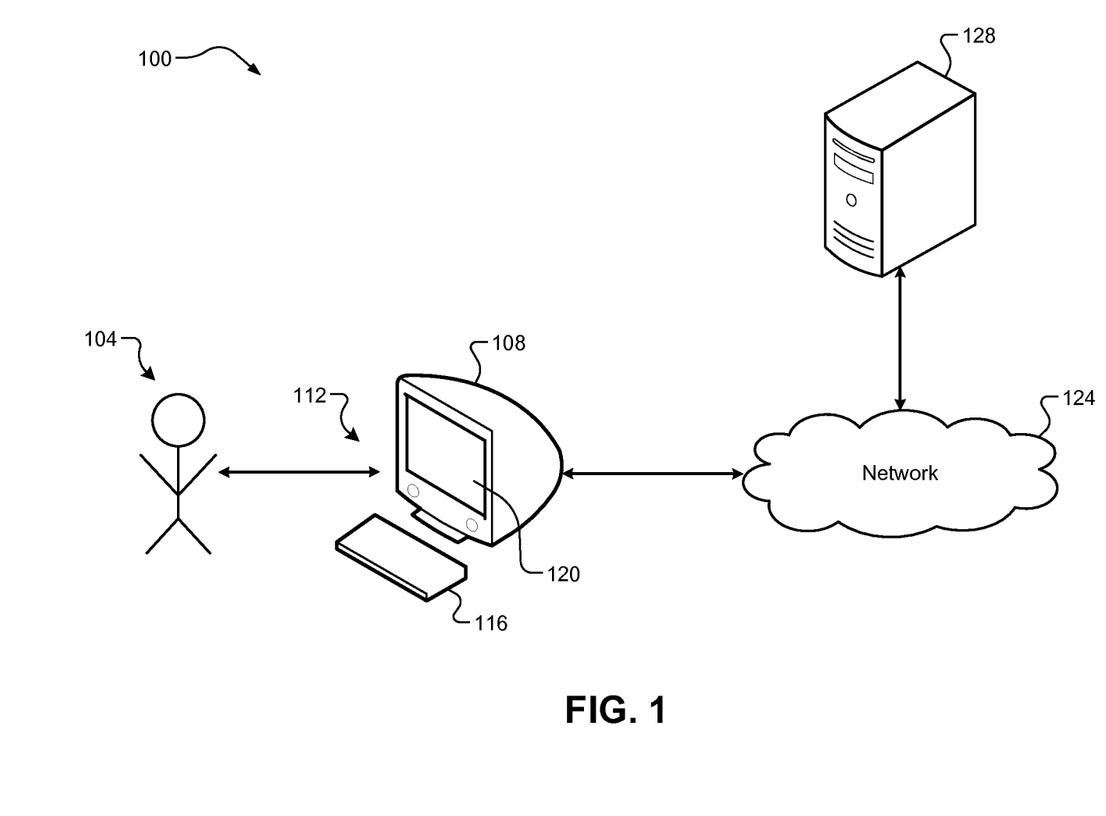
FIG. 1 is a schematic illustration of an example computing network including a computing device according to some implementations of the present disclosure.

Referring now to FIG. 1, a computing network 100 is illustrated. A user 104 can interact with a computing device 108 that includes one or more processors. The computing device 108 can be a desktop computer, a laptop computer, a tablet computer, a mobile phone, or any other suitable computing device. The computing device 108 can also include a user interface 112. The user interface 112 can include an input device 116 and a display 120. The input device 116 can be a mouse. It should be appreciated that the computing device 108 can include more than one input device, e.g., a mouse and a keyboard. The display 120 can display information to the user 104. It should be appreciated that the display 120 can also be a touch display that can display information to and receive input from the user 104.

The computing device 108 can communicate with a web server 128 via a network 124. The network 124 can be a local area network (LAN), a wide area network (WAN), e.g., the Internet, or a combination thereof. It should be appreciated that while one web server 128 is shown, the web server 128 can be implemented as two or more servers operating in a distributed architecture. The web server 128 can include one or more processors. The web server 128 can selectively provide a source document to the computing device 108 via the network 124. The source document can represent a web page. For example, the source document may be a hypertext markup language (HTML) document. The web server 128 can provide the source document in response to a request from the user 104 via the computing device 108. The web server 128 can store, e.g., in memory, a plurality of different source documents.

Figure 2:
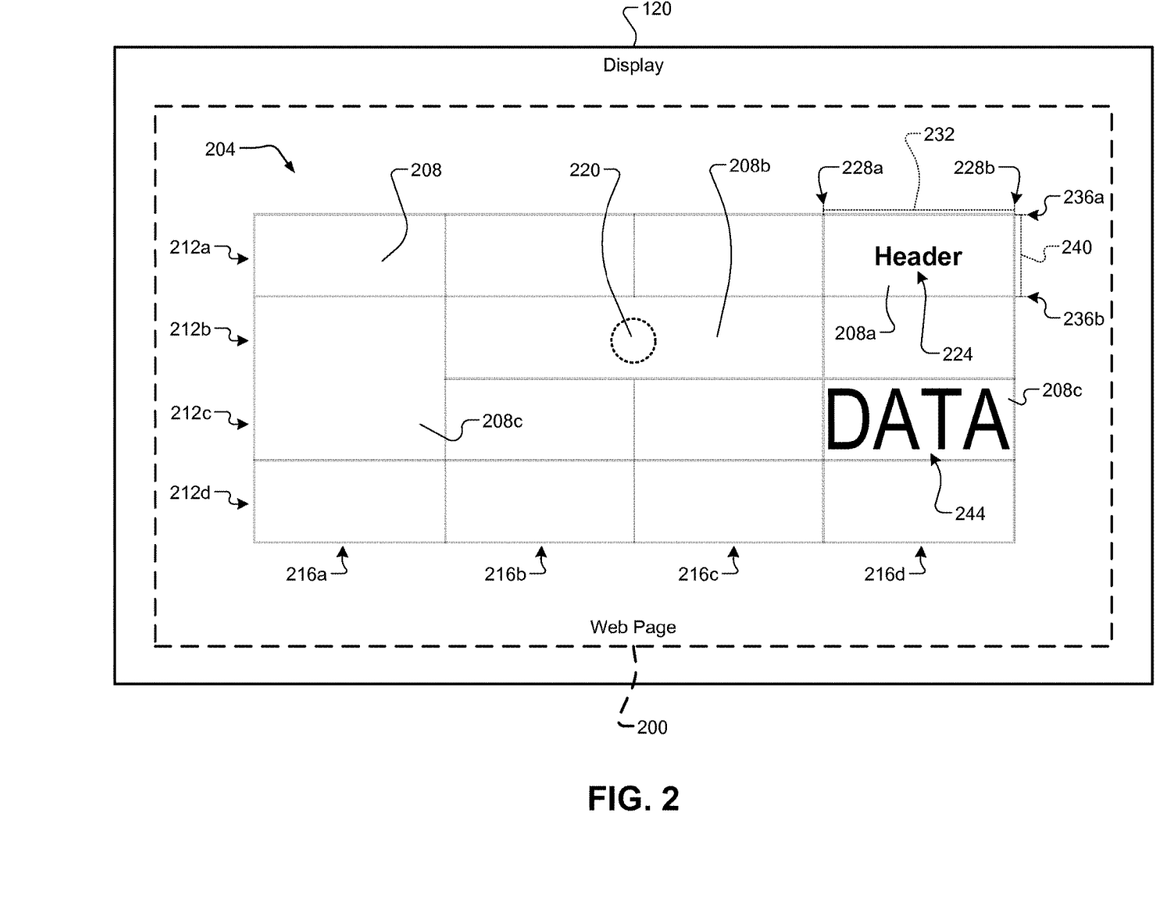
FIG. 2 is a schematic illustration of an example web page displayed at the computing device of FIG. 1.

Referring now to FIG. 2, a web page 200 is illustrated. The computing device 108 can generate the web page 200 using the source document and web browser software executing on the computing device 108. The web page 200 can be displayed at the display 120 of the computing device 108. The web page 200 can include a table 204. The table 204 can include a plurality of cells arranged in one or more rows and one or more columns. While a single cell 208 is referenced, it should be appreciated that the table 204 can include a plurality of cells (hereinafter cells 208). The table 204 includes sixteen cells 208 arranged in four rows 212*a*-212*d* and four columns 216*a*-216*d*. For simplicity, the rows 212*a*-212*d* and columns 216*a*-216*d* can be referred to generally as rows 212 and columns 216. Each of the cells 208 can include data, such as text, an image, or a hyperlink. It should be appreciated that other numbers of cells and other row/column configurations can be implemented.

In addition to information representing the table 204, the source document can include program code. For example, the program code may be a script, such as Javascript. It should be appreciated that other program code may be implemented. The program code can cause the web browser software executing on the computing device 108 to perform one or more functions. The one or more functions may depend on a location of interaction by the user 104, e.g., with respect to the table 204. For example, the program code could cause the web browser software to execute a different function in each column of the table 204. For example only, a function may be highlighting a corresponding row and/or column after the user 104 clicks on a cell 208.

Each cell 208 of the table 204, however, can span more than one row 212 and/or more than one column 216. As shown in FIG. 1, cell 208b (located in row 212b) spans both columns 216b and 216c. Therefore, the actual or exact location of the user interaction with respect to the table 204 (within cell 208b) may be unknown by the web browser software executing on the computing device 108. For example only, user interaction at position 220 is at a center of cell 208b, but overlaps columns 216b and 216c. The program code, therefore, may be unable to determine whether to execute the one or more functions associated with column 216b or the one or more functions associated with column 216c.

The computing device 108 can determine the location of the user interaction in order to properly execute the one or more functions specified by the program code. For example, the computing device 108 can pre-calculate offsets for each of the cells 208 based on colStart, colEnd, rowStart, and rowEnd attributes during loading of the web page 200. The computing device 108 could then store the offsets in an array. Alternatively, for example, the computing device 108 could detect headers and sub-headers having colSpan attributes, but without rowSpan attributes. In this manner, the computing device 108 could iteratively determine the actual position of the user interaction within the table 204 by taking into account the span of each cell 208. This process, however, can be time consuming.

Accordingly, techniques are presented for determining the location of user interaction within a table of a web page. The techniques generally provide for faster determination of the location of user interaction within a table of a web page. The techniques can receive, at a computing device comprising one or more processors, a source document for a web page from a server. The source document can include program code, e.g., Javascript, and information representing a table of the web page. The techniques can generate, at the computing device, the web page using the source document and web browser software executing on the computing device.

During generation of the web page, the techniques can determine, at the computing device, a range of pixel positions for each header cell element of the table. The header cell elements refer to header cells (a top row) of the various columns of the table. For example, in an HTML source document the header cell elements can be indicated by <TH> tags. Cell 208a of FIG. 2 illustrates an example header cell. For example only, the information in the source document for cell 208a could be <TH id="h4">Header</TH>. A pixel position refers to a relative position of the web page 200. The pixel position can depend on a resolution of the display 120. For example only, the resolution could be 1024 pixels wide by 768 pixels high. Further, while pixel-based positions are described herein, it should be appreciated that other positioning techniques can be used.

The techniques can determine the range of pixel positions for each header cell element of the table by determining maximum (or absolute) dimensions required by data within the various cells of the table. The range of pixel positions for a header cell, e.g., cell 208a, may depend on the size of data within the other cells in the corresponding column, e.g., column 216d. Cell 208c of FIG. 2 illustrates a largest portion of data 244 (the text "DATA"), upon which the range of pixel positions for header cell 208a depends. More specifically, a range of pixel positions 232 for header cell 208a spans from an absolute left position 228a to an absolute right position 228b. It should be appreciated, however, that other suitable techniques can also be used to determine the range of pixel positions for each header cell element.

The techniques can receive, at the computing device, input from a user indicating interaction by the user at a position within the table of the web page. The techniques can select, at the computing device, one of the columns of the table based on the position of the user interaction and the ranges of pixel positions for the header cell elements to obtain a selected column. The selected column can be a column having a header cell element with a range of pixel positions that includes the position of the user interaction. The techniques can execute, at the computing device, the program code, e.g., Javascript, based on the selected column.

While determination of a column based on ranges of pixel positions for header cell elements is described above and throughout the written description, it should be appreciated that the techniques of the present disclosure could be applied to determination of a row. More specifically, a column could span more than one row and therefore the techniques could determine a row for the user interaction in order to properly execute one or more functions specified by the program code and associated with the row. For example only, FIG. 2 illustrates a cell 208c in column 216a that spans rows 212b and 212c, and a range of pixel positions 240 could be determined based on absolute end points 236a and 236b (similar to above) for each of the rows 212a-212d.

Figure 3:
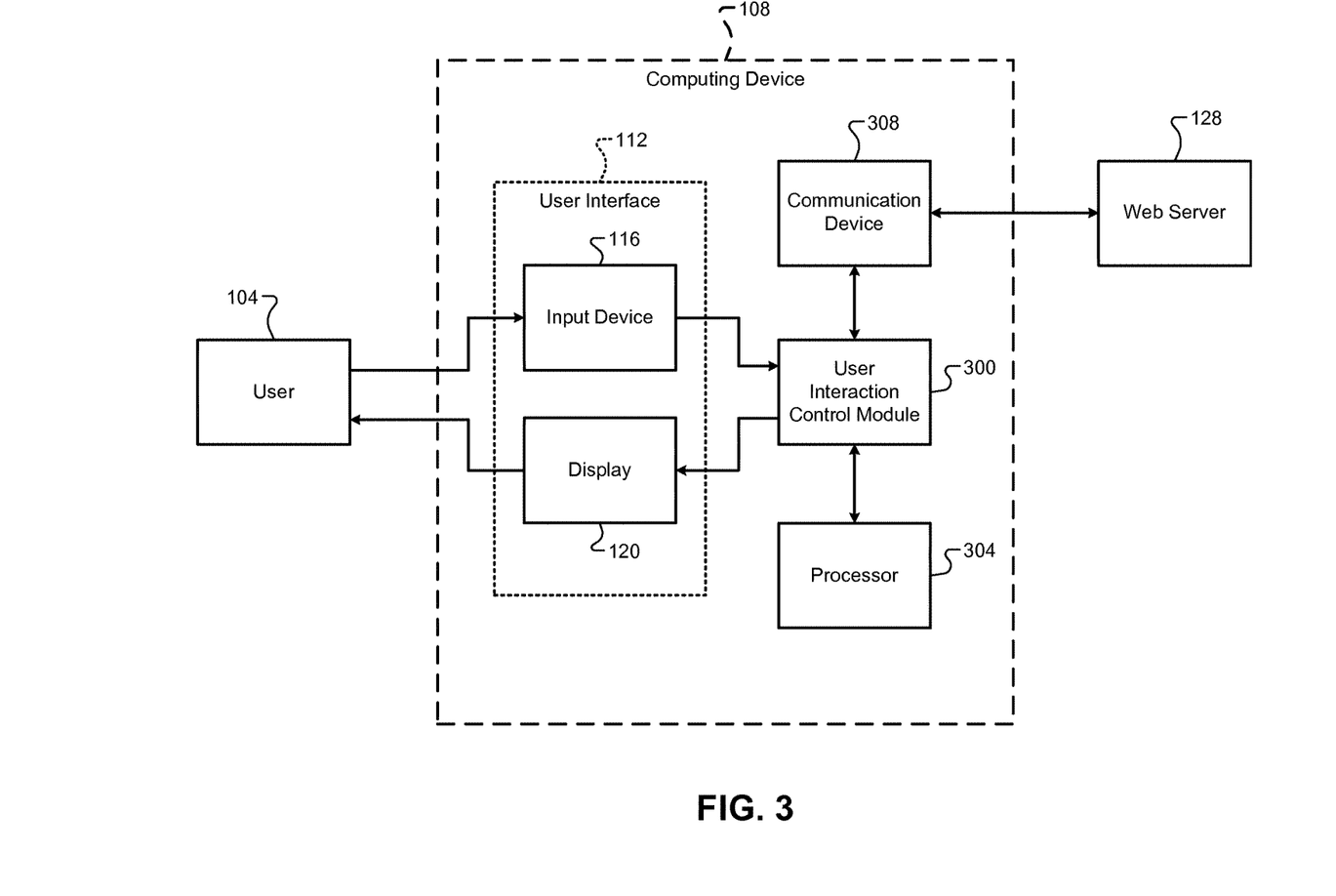
FIG. 3 is a functional block diagram of the computing device of FIG. 1 including a user interaction control module according to some implementations of the present disclosure.

Referring now to FIG. 3, the computing device 108 is illustrated. The computing device 108 can include the user interface 112, a user interaction control module 300, a processor 304, and a communication device 308. The user interface 112 can include the input device 116 and the display 120. It should be appreciated that the computing device 108 can also include other components, e.g., memory. It should also be appreciated that the term "processor" used herein can refer to two or more processors operating in a parallel or distributed architecture. Additionally, the processor 304 can wholly or partially execute the various modules of the computing device 108.

The user interface 112 can include the input device 116 and the display 120. As previously described, the user interface 112 can further include additional components, such as one or more additional input devices. The user interface 112 can display the web page 200 to the user 104. The user interface 112 can also receive input from the user 104. The input from the user 104 can include interaction by the user 104 within the table 204 of the web page 200. Example user interaction can include clicking on a cell within the table 204.

The user interaction control module 300 can generate the web page 200 for display by the user interface 112. The user interaction control module 300 can also interpret the input from the user 104. The user interaction control module 300 can also perform the techniques of the present disclosure in order to determine the location of the user interaction within the table 204 of the web page 200. More specifically, the user interaction control module 300 can determine a range of pixel positions for each header cell element of the table 204 during generation of the web page 200. The user interaction control module 300 can select one of the columns of the table 204 based on the position of the user interaction and the ranges of pixel positions of the header cell elements. More specifically, the user interaction control module 300 can determine which range of pixel positions includes the position of the user interaction. The user interaction control module 300 can then execute the one or more functions specified by the program code and associated with the selected column.

The processor 304 can control operation of the computing device 108. For example, the processor 304 can load and execute an operating system of the computing device 108. The processor 304 can also execute the web browser software. Further, the processor 304 can execute (entirely or partially) the various modules of the computing device 108. The communication device 308 can control communication between the computing device 108 and other computing devices via the network 124. Specifically, the communication device 308 can provide the request to the web server 128 via the network 124 and can then receive the source document from the web server 128 via the network 124.

Figure 4:
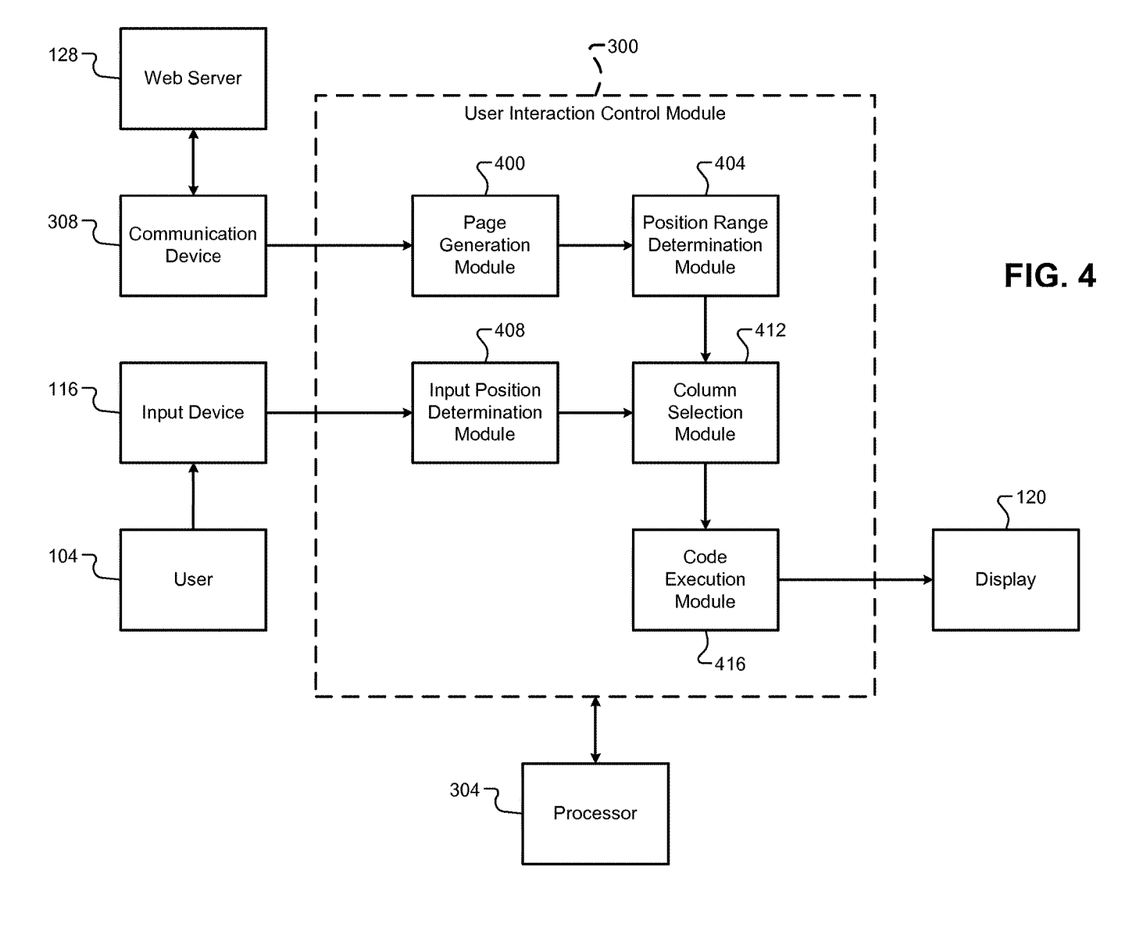
FIG. 4 is a functional block diagram of the user interaction control module of FIG. 3.

Referring now to FIG. 4, the user interaction control module 300 is illustrated. The user interaction control module 300 can include a page generation module 400, a position range determination module 404, an input position determination module 408, a column selection module 412, and a code execution module 416. The user interaction control module 300 can also include other components, e.g., memory. As previously mentioned, the one or more processors, e.g., processor 304, can be used to execute (wholly or partially) the various modules of the user interaction control module 300.

The communication device 308 can include one or more components suitable for communication via the network 124, such as a transceiver. The communication device 308 can receive the source document from the web server 128 via the network 124. The communication device 308 can provide the source document to the page generation module 400. As previously described, the source document can include program code, e.g., Javascript, and information representing a table. For example only, the table 204 can include a plurality of cells having two or more columns, one or more rows, and a specific cell, e.g., cell 208*b*, which spans more than one of the two or more columns. The table 204 could also include a plurality of cells spanning more than one column.

The page generation module 400 can generate the web page 200 using the source document. As previously described, the page generation module 400 may include web browser software configured to interpret the source document in order to generate the web page 200. The web browser software can be any suitable software configured to interpret source documents, e.g., HTML documents. The page generation module 400 can use the web browser software to parse the source document and interpret tags in order to generate (or build) the web page 200. Generation of the web page 200 can also include generation of the table 204

The position range determination module 404 can determine the range of pixel positions for each header cell element of the table 204. The position range determination module 404 can determine the ranges of pixel positions during generation of the web page 200 by the page generation module 400. It should be appreciated that the ranges of pixel positions could also be determined at other times, e.g., before generation of the web page 200. The position range determination module 404 could first identify each header cell element in the source document. For example, in an HTML source document the header cell elements may be identified by <TH> tags. During generation of the table 204, the position range determination module 404 can then determine absolute left and right pixel positions (boundaries) for each header cell element. As previously described, these absolute pixel positions can depend on sizes of data in other cells of the column associated with the header cell element. The ranges of pixel positions can then be defined between the absolute left and right pixel positions.

The input position determination module 408 can determine the position of the user interaction within the table 204 of the web page 200. The position of the user interaction within the table 204 can also be a pixel position. The position of the user interaction can be monitored by software associated with the input device 116, e.g., mouse software. As previously described, the user interaction may involve a selection (or click) by the user 104, e.g., using a mouse. The input position determination module 408, therefore, may not determine the position of the user interaction until the user 104 provides a click within the table 204, e.g., selection of a cell 208. For example, the input position determination module 408 may monitor the user interaction for a click within a cell 208 that spans more than one column, e.g., cell 208*b*.

The column selection module 412 can select a column of the table 204 based on the position of the user interaction and the ranges of pixel positions associated with the header cell elements to obtain a selected column. For example, the column selection module 412 may select a column having a header cell element with a range of pixel positions that includes the position of the user interaction. More specifically, the column selection module 412 could select one of the columns spanned by the specific cell, e.g., cell 208*b*. In other words, when the position of the user interaction is within the specific cell spanning more than one column, the column selection module 412 can select one of the columns spanned by the specific cell.

The code execution module 416 can execute a portion of the program code, e.g., Javascript, associated with the selected column. Executing the portion of the program code can include performing one or more functions defined in the source document and associated with the selected column. For example, the program code could include two or more portions of code associated with the two or more columns of the table 204. The code execution module 416, therefore, could execute one of two or more portions of code associated with the selected column from two or more columns that are spanned by the specific cell.

Figure 5:
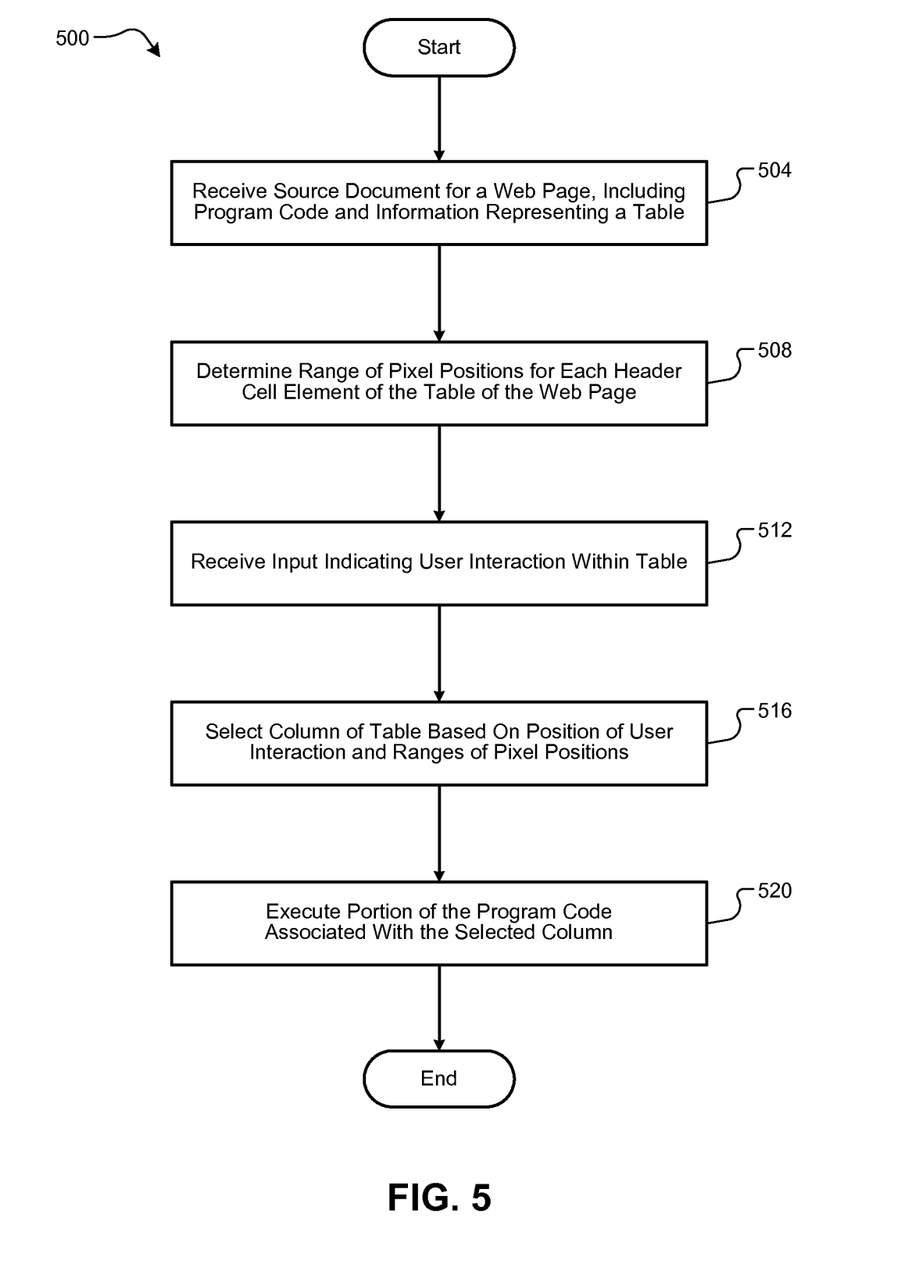
FIG. 5 is a flow diagram of an example technique for determining a location of user interaction within a table of a web page according to some implementations of the present disclosure.

Referring now to FIG. 5, an example technique 500 for determining a location of user interaction within a table of a web page is illustrated. At 504, the communication device 308 can receive a source document for the web page 200 from the web server 128. The source document can include program code and information representing the table 204 of the web page 200. At 508, the position range determination module 404 can determine a range of pixel positions for each header cell element of the table 204. The header cell elements can represent cells of a top row of the table 204, e.g., row 212*a*. For example, the position range determination module 404 can determine the ranges of pixel positions during generation of the web page 200 by the page generation module 400.

At 512, the user interface 112 can receive input from the user 104 indicating an interaction by the user 104 at a position within the table 204 of the web page 200. For example, the position of the user interaction can be determined by the input position determination module 408. At 516, the column selection module 412 can select a column of the table 204 based on the position of the user interaction and the ranges of pixel positions to obtain a selected column. For example, the selected column can be a column having a header cell element with a corresponding range of pixel positions that includes the position of the user interaction. At 520, the code execution module 416 can execute a portion of the program code associated with the selected column. The technique 500 can then end or return to 504 for one or more additional cycles.

Figure 6:
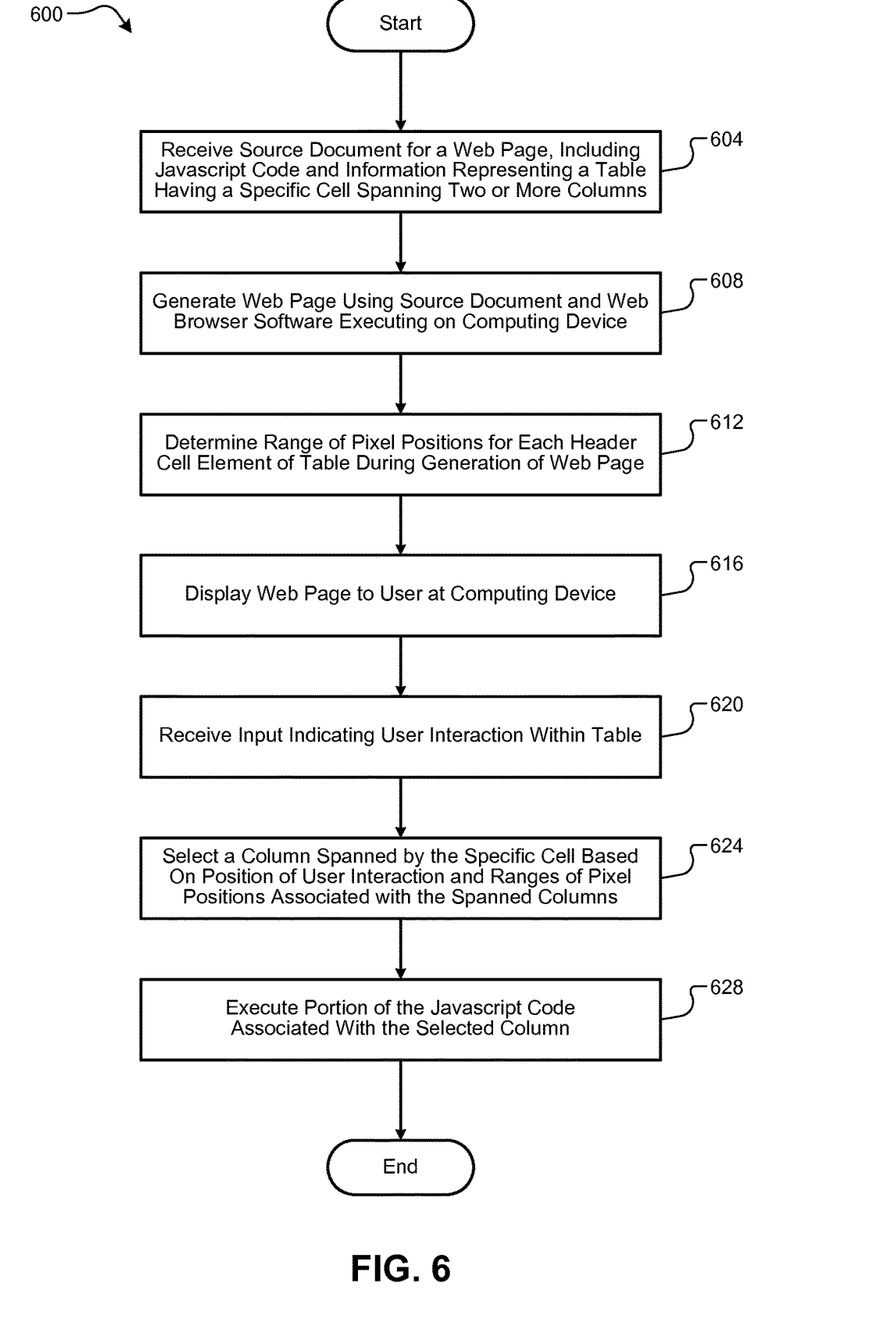
FIG. 6 is a flow diagram of another example technique for determining a location of user interaction within a table of a web page according to some implementations of the present disclosure.

Referring now to FIG. 6, another example technique 600 for determining a location of user interaction within a table of a web page is illustrated. At 604, the communication device 308 can receive the source document for the web page 200 from the web server 128. The source document can include Javascript code and information representing the table 204 of the web page 200. The table 204 can include a plurality of cells arranged in two or more columns and one or more rows. The plurality of cells can include a specific cell, e.g., cell 208b, that spans more than one column. The Javascript code can include two or more portions associated with the two or more columns, respectively.

At 608, the page generation module 400 can generate the web page 200 using the source document and web browser software executing on the computing device 108. At 612, the position range determination module 404 can determine a range of pixel positions for each header cell element of the table 204 during generation of the web page 200. The header cell elements can represent cells of a top row of the table 204, e.g., row 212a. At 616, the user interface 112 can display the web page 200 to the user 104 of the computing device 108. At 620, the user interface 112 can receive input from the user 104 indicating interaction by the user 104 at a position within the specific cell that spans more than one column, e.g., cell 208b. For example, the input position determination module 408 can determine the position of the user interaction.

At 624, the column selection module 412 can select one of the columns spanned by the specific cell based on the position of the user interaction and ranges of pixel positions for the header cell elements associated with the columns spanned by the specific cell to obtain a selected column. The selected column can have a header cell element with a corresponding range of pixel positions that includes the position of the user interaction. At 628, the code execution module 416 can execute one of the two of more portions of Javascript code associated with the selected column. The technique 600 can then end or return to 604 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   receiving, at a computing device including one or more processors, a source document for a web page from a server, the source document including Javascript code and information representing a table of the web page, the table including a plurality of cells arranged in two or more columns and one or more rows, the plurality of cells including a specific non-header cell that spans a first column and a second column adjacent to the first column, a first header cell element representing a top row of the table for the first column, a second header cell element representing a top row of the table for the second column, the Javascript code including a first portion corresponding to the first column and a second portion corresponding to the second column;
   generating, at the computing device, the web page using the source document and web browser software executing on the computing device;
   during generation of the web page, determining, at the computing device, from the source document, a first range of pixel positions for the first header cell element and a second range of pixel positions for the second header cell element of the table;
   displaying, at the computing device, the web page to a user at the computing device;
   receiving, at the computing device, input from the user, the input indicating interaction by the user at a pixel position within the non-header specific cell that spans the first column and the second column;
   selecting, at the computing device, the first column spanned by the non-header specific cell based on the pixel position of the user interaction located within the first range of pixel positions defined by the first header cell element; and
   executing, at the computing device, the first portion of the Javascript code corresponding to the first column.

2. A computer-implemented method, comprising:
   receiving, at a computing device including one or more processors, a source document for a web page from a server, the source document including program code and information representing a table of the web page, the table including a plurality of cells arranged in two or more columns and one or more rows, the plurality of cells including a specific non-header cell that spans a first column and a second column adjacent to the first column, a first header cell element representing a top row of the table for the first column, and a second header cell element representing a top row of the table for the second column;
   determining, at the computing device, from the source document, a first range of pixel positions for the first header cell element of the table and a second range of pixel positions for the second header cell element of the table;
   receiving, at the computing device, input from a user, the input indicating an interaction by the user at a pixel position within the table of the web page;
   selecting, at the computing device, the first column of the table based on the pixel position of the user interaction located within the first range of pixel positions defined by the first header cell element; and
   executing, at the computing device, a portion of the program code corresponding to the first column.

3. The computer-implemented method of claim 2, wherein the first column is a specific column of the table having the first header cell element with a corresponding range of pixel positions that includes the position of the user interaction.

4. The computer-implemented method of claim 2, wherein the program code includes a first portion associated with the first column and a second portion associated with the second column, and wherein executing the portion of the program code further includes executing the first portion of the program code associated with the first column.

5. The computer-implemented method of claim 3, further comprising generating, at the computing device, the web page using the source document and web browser software executing on the computing device.

6. The computer-implemented method of claim 5, wherein determining the first range of pixel positions for the first header cell element and the second range of pixel positions for the second header cell element of the table occurs during the generation of the web page.

7. The computer-implemented method of claim 6, further comprising displaying, at the computing device, the web page to a user at the computing device using the web browser software.

8. A computing device comprising:
a communication device configured to receive a source document for a web page from a server, the source document including program code and information representing a table of the web page, the table including a plurality of cells arranged in two or more columns and one or more rows, the plurality of cells including a specific cell that spans a first column and a second column adjacent to the first column, a first header cell element representing a top row of the table for the first column, and a second header cell element representing a top row of the table for the second column;
one or more processors configured to determine, from the source document, a first range of pixel positions for the first header cell element of the table and a second range of pixel positions for the second header cell element of the table, wherein the header cell elements represent cells of a top row of the table; and
a user interface configured to receive input from a user, the input indicating an interaction by the user at a pixel position within the table of the web page, wherein the one or more processors are further configured to:
select the first column of the table based on the pixel position of the user interaction located within the first range of pixel positions defined by the first header cell element associated with the first column; and
execute a portion of the program code corresponding to the first column.

9. The computing device of claim 8, wherein the first column is a specific column of the table having the first header cell element with a corresponding range of pixel positions that includes the position of the user interaction.

10. The computing device of claim 8, wherein the program code includes two or more portions associated with the two or more columns, respectively, and wherein the one or more processors are configured to execute the portion of the program code by executing one of the two or more portions of the program code associated with the selected column.

11. The computing device of claim 9, wherein the one or more processors are further configured to generate the web page using the source document and web browser software executing on the computing device, and wherein the determination of the first range of pixel positions for the first header cell element and of the second range of pixel positions for the second header cell element of the table by the one or more processors occurs during the generation of the web page.

12. The computing device of claim 11, wherein the user interface is further configured to display the web page to a user at the computing device using the web browser software.

* * * * *